(12) United States Patent
Heck et al.

(10) Patent No.: US 9,400,521 B2
(45) Date of Patent: Jul. 26, 2016

(54) FLEXIBLE PORTABLE ELECTRONIC DEVICE

(71) Applicant: The Swatch Group Research and Development Ltd., Marin (CH)

(72) Inventors: Pascal Heck, Erlach (CH); Cedric Nicolas, Neuchatel (CH)

(73) Assignee: The Swatch Group Research and Development Ltd., Marin (CH)

( * ) Notice: Subject to any disclaimer, the term of this patent is extended or adjusted under 35 U.S.C. 154(b) by 222 days.

(21) Appl. No.: 14/088,601

(22) Filed: Nov. 25, 2013

(65) Prior Publication Data

US 2014/0168872 A1    Jun. 19, 2014

(30) Foreign Application Priority Data

Dec. 17, 2012    (EP) .................................... 12197481

(51) Int. Cl.
 *G06F 1/16*    (2006.01)
 *G04G 17/04*    (2006.01)
 *G04G 17/08*    (2006.01)
(52) U.S. Cl.
 CPC ................ *G06F 1/163* (2013.01); *G04G 17/04* (2013.01); *G04G 17/045* (2013.01); *G04G 17/08* (2013.01)
(58) Field of Classification Search
 CPC .................. G06F 1/163; G06F 1/1652; H05K 2201/10098; H05K 2201/10151; H05K 9/009; G04G 17/04; G04G 17/045

USPC ............ 361/679.03, 679.21, 679.26, 679.01, 361/679.27, 679.02, 749; 345/173
See application file for complete search history.

(56) References Cited

U.S. PATENT DOCUMENTS

| 5,491,691 | A | * | 2/1996 | Shtayer | ................... | H04J 3/247 370/395.42 |
|---|---|---|---|---|---|---|
| 2001/0043513 | A1 | | 11/2001 | Grupp | | |
| 2003/0026171 | A1 | | 2/2003 | Brewer et al. | | |
| 2012/0314546 | A1 | | 12/2012 | Brewer et al. | | |

FOREIGN PATENT DOCUMENTS

WO    2011/103317 A1    8/2011

OTHER PUBLICATIONS

European Search Report issued Jun. 13, 2013, in Patent Application No. EP 12 19 7481, filed Dec. 17, 2012 (with English-language translation).

* cited by examiner

*Primary Examiner* — Anthony Haughton
*Assistant Examiner* — Ingrid Wright
(74) *Attorney, Agent, or Firm* — Oblon, McClelland, Maier & Neustadt, L.L.P.

(57) ABSTRACT

Flexible portable electronic device capable of elaborating information, including a flexible body arranged to be capable of being secured to a part of the user's body, the flexible body including a lower flexible band and an upper flexible band. The flexible portable electronic device includes an electronic assembly for processing information, the electronic assembly for processing information including at least a first electronic component with a substantially flat surface, housed between the upper flexible band and the lower flexible band of the flexible body. The first electronic component is secured on only one portion of the surface thereof to one of the upper or lower flexible bands.

20 Claims, 1 Drawing Sheet

FLEXIBLE PORTABLE ELECTRONIC DEVICE

This application claims priority from European Patent Application No. 12197481.0 filed Dec. 17, 2012, the entire disclosure of which is incorporated herein by reference.

FIELD OF THE INVENTION

The present invention concerns a flexible portable electronic device intended to be worn around a part of the user's body, such as a wrist.

BACKGROUND OF THE INVENTION

Portable electronic devices such as smart cards are known. These smart cards conventionally include an electronic assembly capable of at least elaborating information. The electronic assembly is formed of a plurality of components which are arranged next to each other in the plane of the smart card and which are embedded in a plastic material which provides the smart card with a shape and high mechanical resistance. In most cases, these smart cards are thin and are not intended to be subject to high bending angles in normal conditions of use. Consequently, the electronic components confined in the body of the smart card are slightly deformed or not deformed at all and the homogeneity of the connection between the components and the plastic material of which the smart card body is made is not at risk.

The situation is quite different when the flexible portable electronic device is intended to be subjected to high bending angles, for example because it is wound around a user's wrist. Such flexible portable electronic devices, for example wristwatches, include an electronic assembly for elaborating and where necessary displaying information, which is formed of an information display device, such as a liquid crystal display device, a flexible printed circuit which carries the integrated and discrete components required for the proper operation of the portable electronic device, and an electric power battery. These various electronic components generally take the form of broad, flat elements, arranged one on top of the other. They are over-moulded in a plastic material such as an elastomer, which gives the portable electronic device thickness and mechanical resistance.

It is clear that, when the portable electronic device is wound, the radius of curvature of the various electronic components which form the electronic assembly for processing information varies according to the position of each of the components in the stack of components. The lower the radius of curvature, the higher the angle of winding of the corresponding component will be. Differences in winding length may therefore be observed according to the position and length of the components. However, if the various electronic components are, for example, bonded over their entire surface, the differences in length must be compensated for by the elasticity of the electronic components and the bonds have to resist high shear stresses. If the elasticity of the electronic components is insufficient or if the bonds do not resist the stresses, the portable electronic device is liable to warp or delamination which leads to the destruction of the device.

SUMMARY OF THE INVENTION

It is an object of the present invention to overcome these and other drawbacks by providing a flexible portable electronic device that can be wound around a part of the user's body with very low radii of curvature and without any risk of warping or delamination of the electronic components which form the electronic assembly for processing information.

The present invention therefore concerns a flexible portable electronic device capable of elaborating information, said flexible portable electronic device including a flexible body arranged to be capable of being secured to a part of a user's body, the flexible body including a lower flexible band and an upper flexible band, the flexible portable electronic device including an electronic assembly for processing information, the electronic assembly for processing information including at least a first electronic component with a substantially flat surface, said first electronic component being housed between the lower flexible band and the upper flexible band of the flexible body, the flexible portable electronic device being characterized in that the first electronic component is mechanically held on only one portion of the surface thereof to one of the upper or lower flexible bands.

According to a complementary feature of the invention, the electronic assembly for processing information includes a second electronic component with a substantially flat surface, the second electronic component being arranged substantially underneath the first electronic component, and the second electronic component being mechanically held on only one part of the surface thereof to the first electronic component.

According to another feature of the invention, the electronic assembly for processing information includes a second electronic component with a substantially flat surface, the second electronic component being arranged substantially in the extension of the first electronic component, and the second electronic component being connected to the first electronic component by means of a resilient connector.

As a result of these features, the present invention provides a flexible portable electronic device wherein the electronic components for processing information are mechanically held to each other or to one of the upper or lower flexible bands of the flexible body on only one part of the surface of said components. The electronic components for processing information are therefore hardly connected or not connected to the plastic material of which the flexible portable electronic device of the invention is made, so that the risk of warping or delamination is negligible. Further, the electronic components for processing information maintain their ability to deform elastically, which allows them to slide in relation to each other and to increase their winding angle and absorb stresses due to the bending of the portable electronic device.

BRIEF DESCRIPTION OF THE DRAWINGS

Other features and advantages of the present invention will appear more clearly from the following detailed description of one embodiment of the flexible portable electronic device according to the invention, this example being given solely by way of non-limiting illustration with reference to the annexed drawing, in which.

DETAILED DESCRIPTION OF THE PREFERRED EMBODIMENTS

The present invention proceeds from the general inventive idea which consists in providing a flexible portable electronic device wherein the electronic components for processing information are mechanically held to each other, or to one of the flexible bands of the flexible body of the portable electronic device, via only one portion of the surface of said components. When the portable electronic device is bent to be fitted, for example to the contour of a user's wrist, the electronic components maintain their ability to deform elastically and to increase their winding angle in a sliding motion relative to each other. Indeed, the surface via which the electronic components are mechanically held to each other or to the flexible body of the portable electronic device is small, so that there is no risk to the homogeneous connection between the electronic components and the plastic material of which the flexible body is made and the risk of warping or delamination of the electronic components is virtually completely eliminated.

According to the invention, "mechanical hold" means, in particular, adhesive bonding on only one portion of the surface of a first electronic component to a second electronic component or to one of the flexible bands of the flexible body of the flexible portable electronic device of the invention. Other securing techniques such as, for example, welding, in particular thermowelding, may also be envisaged within the scope of the present invention. It is also possible to envisage using hooks to mechanically hold two electronic components to each other or to one of the flexible bands of the flexible body.

Figure 1:
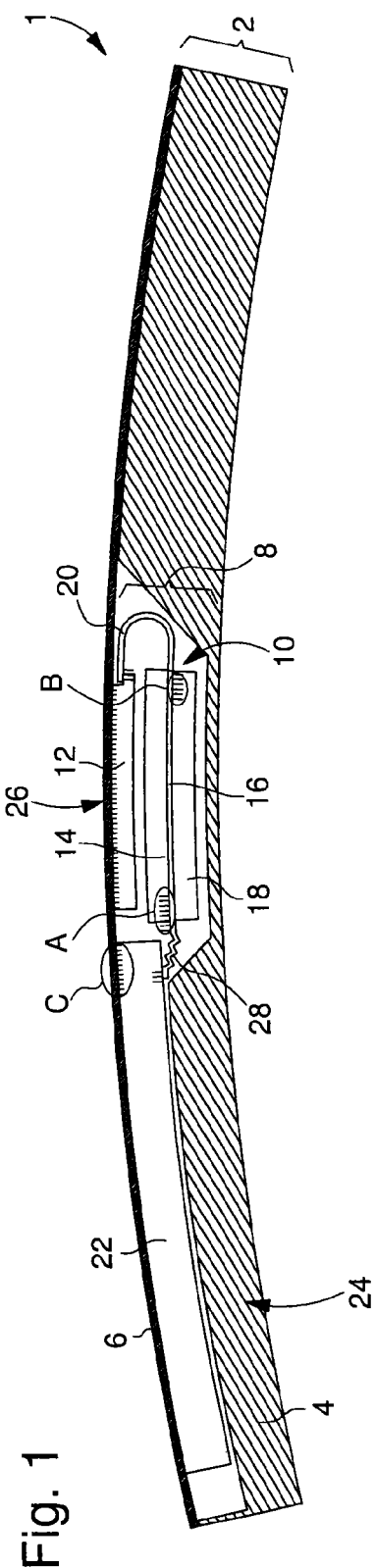
FIG. 1 is a longitudinal cross-section of the flexible portable electronic device according to the invention at rest.
Figure 2:
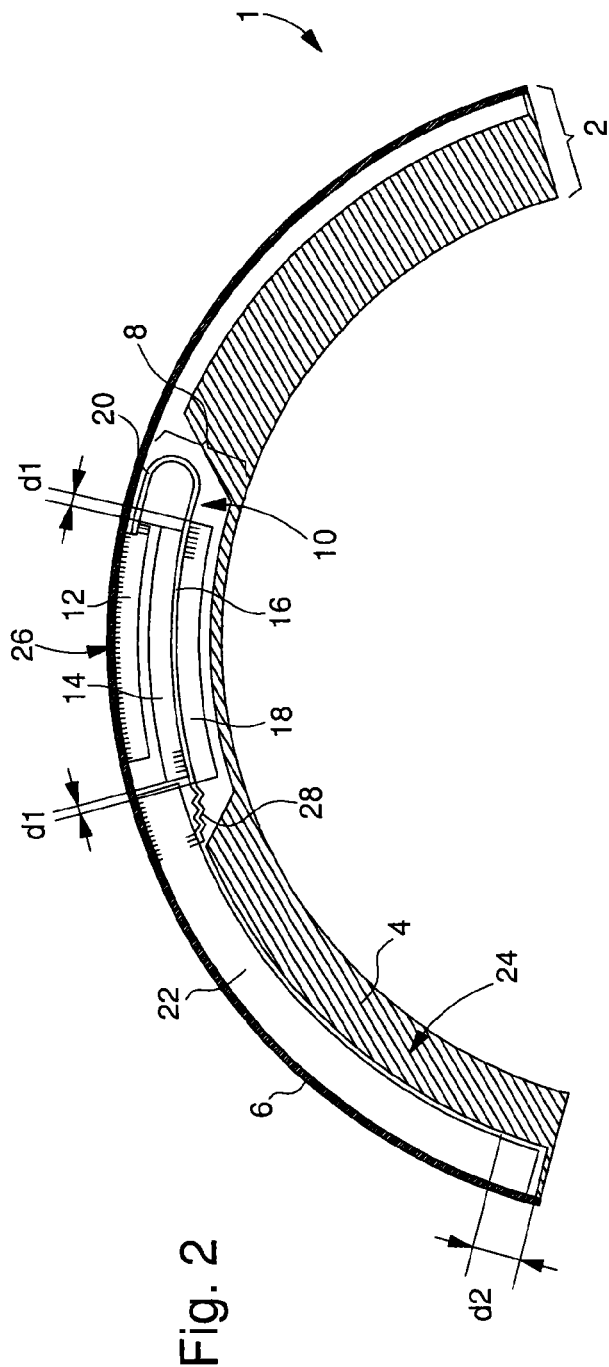
FIG. 2 is a similar view to that of FIG. 1, showing the flexible portable electronic device in a bent position.

FIGS. 1 and 2 annexed to this Patent Application are longitudinal cross-sections of the flexible portable electronic device of the invention, respectively at rest and in the bent position in order to fit the contour of a part of a user's body, such as for example, the wrist.

Designated as a whole by the general reference number 1, the portable electronic device according to the invention is flexible. Portable electronic device 1 includes a flexible body 2, which has substantially the shape of a band or a bracelet and which is formed of a lower flexible band 4 and an upper flexible band 6. The lower flexible band 4 can be made of any plastic material, such as elastomer. The top flexible band 6 takes the form of an impermeable plastic film secured to lower flexible band 4. Upper flexible band 6 may be secured to lower flexible band 4 by any appropriate means such as bonding or thermowelding.

The function of portable electronic device 1 is to be able to at least process information, and in the preferred example, to process and display information. Thus, portable electronic device 1 includes an electronic assembly 8 for processing information, mounted on upper flexible band 6 on the side to which lower flexible band 4 is secured. For this purpose, lower flexible band 4 has, at one point on the length thereof, a housing 10 in which there is arranged electronic assembly 8 for the elaboration and display of information.

In the example shown in the drawing, electronic assembly 8 for the elaboration and display of information includes a stack of electronic components, the first of which is a display device 12, such as a liquid crystal cell, underneath which there is arranged a light guide 14 for backlighting display device 12. The assembly is supplemented by a flexible printed circuit 16 on which there are mounted the various integrated and discrete electronic components (not shown in the drawing) required for the proper operation of portable electronic device 1, in particular a time base. Flexible printed circuit 16, arranged underneath light guide 14, is connected to display device 12, to light guide 14, and to a rechargeable accumulator 18 by means of a plurality of connectors 20. Rechargeable accumulator 18, arranged underneath flexible printed circuit 16, at the bottom of housing 10, is powered by at least one solar cell 22, which is advantageously housed in one of the bracelet strands 24.

In the following description, it will be noted that the areas of mechanical hold have been represented by hatched areas surrounded with a circle in FIG. 1.

Electronic assembly 8 for the elaboration and display of information is assembled as follows. First of all, the liquid crystal display cell 12 is bonded over its entire upper surface 26 against the lower surface of upper flexible band 6 by means of an optically clear adhesive or "OCA". It will be clear in fact that, for reasons of display quality, upper surface 26 of liquid crystal display cell 12 must be in close contact with the upper flexible band 6 which covers it.

According to the invention, the next assembly step is the bonding of only one portion of the surface of printed circuit 16 to the rear face of light guide 14. The area of adhesion, which is hatched in the Figures, is surrounded by a circle in the Figures and designated by the letter A. Given that flexible printed circuit 16 is a generally rectangular electronic component with a substantially flat surface, it will be clear that flexible printed circuit 16 is bonded on only one of its surfaces transverse to the longitudinal axis of symmetry of the bracelet. Consequently, when portable electronic device 1 is bent to be fitted, for example to the user's wrist, flexible printed circuit 16 is capable of deforming elastically and modifying its winding angle by effecting a sliding motion relative to light guide 14.

Likewise, rechargeable accumulator 18 is bonded on only one portion of its surface to the rear face of flexible printed circuit 16. The area of adhesion, which is hatched in the Figures, is surrounded by a circle in the Figures and designated by the letter B. If, as explained above with reference to flexible printed circuit 16, it is noted that rechargeable accumulator 18 is a flat electronic component of generally rectangular shape, an examination of the Figures reveals that rechargeable accumulator 18 is bonded on only one side transverse to the longitudinal axis of symmetry of the bracelet. Since rechargeable accumulator 18 is only bonded over a small fraction of its surface, this enables it to deform elastically and to modify its winding angle by effecting a sliding motion relative to printed circuit 16 when portable electronic device 1 is wound, for example around a user's wrist. More specifically, FIG. 2 shows that one end of rechargeable accumulator 18, which is aligned with flexible printed circuit 16 in the rest position of portable electronic device 1, has moved by a length d1 relative to the ends of light guide 14 in the bent position of portable electronic device 1.

Finally, solar cell 22 is locally bonded onto the lower surface of upper flexible band 6. The area of adhesion, which is hatched in the drawings, is surrounded by a circle and designated by the letter C in the drawings. An examination of the drawings reveals that solar cell 22 is a substantially flat electronic component of generally rectangular shape which is only bonded by one side transverse to the longitudinal axis of symmetry of portable electronic device 1. Consequently, when portable electronic device 1 is bent to be fitted, for example, to a user's wrist, there is no risk to the integrity of the connection between solar cell 22 and the material of which the flexible body of portable electronic device 1 is made. Conversely, solar cell 22 is free to deform elastically and to modify its winding arc by a length d2 when portable electronic device 1 is bent.

Finally, an examination of the drawings reveals that solar cell 22 and flexible printed circuit 16 are arranged one after the other in the longitudinal direction of portable electronic device 1, with solar cell 22 arranged at a slightly higher level than flexible printed circuit 16. To take account of the variation in the arc length between solar cell 22 and flexible printed circuit 16 when portable electronic device 1 is bent to be secured, for example to a part of a user's body, solar cell 22 and flexible printed circuit 16 are connected to each other by an electrical connector 28 which has elasticity.

By deforming elastically, electrical connector 28 absorbs the variations in the arc length of flexible printed circuit 16 and solar cell 22 when portable electronic device 1 is bent.

It goes without saying that this invention is not limited to the embodiment that has just been described and that various simple modifications and variants can be envisaged by those skilled in the art without departing from the scope of the invention as defined by the annexed claims. In particular, according to the present invention, the mechanical hold can be achieved either by fixing, typically by bonding, welding or thermowelding, or by using clip type hooks.

What is claimed is:

1. A flexible portable electronic device capable of elaborating information, comprising:
    a flexible body arranged to be capable of being secured to a part of a user's body, wherein the flexible body includes a lower flexible band and an upper flexible band; and
    an electronic assembly for processing information comprising at least a first electronic component with a substantially flat surface, the first electronic component being housed between the lower flexible band and the upper flexible band of the flexible body, wherein the first electronic component is mechanically held to one of the upper or lower flexible bands by adhering only one portion of the surface of the first electronic component that faces the one of the upper or lower flexible bands, the portion of the surface of the first electronic component that is adhered to the one of the upper or lower flexible bands is transverse to a longitudinal axis of symmetry of the flexible portable electronic device.

2. The flexible portable electronic device according to claim 1, wherein the first electronic component is a solar cell secured to the upper flexible band.

3. The flexible portable electronic device according to claim 2, wherein the electronic assembly for processing information includes a second electronic component with a substantially flat surface, wherein the second electronic component is arranged substantially underneath a third electronic component, the second electronic component being mechanically held on only one portion of the surface thereof to the first electronic component.

4. The portable electronic device according to claim 3, wherein the second electronic component is a flexible printed circuit, and wherein the third electronic component is a light guide arranged underneath a display device.

5. The flexible portable electronic device according to claim 4, wherein the electronic assembly for processing information includes a rechargeable accumulator arranged underneath the flexible printed circuit, the rechargeable accumulator being secured on only one portion of the surface thereof to the flexible printed circuit.

6. The flexible portable electronic circuit according to claim 5, wherein the second electronic component is arranged spaced apart from the first electronic component along the longitudinal axis, the second electronic component being connected to the first electronic component by a resilient electrical connector.

7. The flexible portable electronic circuit according to claim 4, wherein the second electronic component is arranged spaced apart from the first electronic component along the longitudinal axis, the second electronic component being connected to the first electronic component by a resilient electrical connector.

8. The flexible portable electronic circuit according to claim 3, wherein the second electronic component is arranged spaced apart from the first electronic component along the longitudinal axis, the second electronic component being connected to the first electronic component by a resilient electrical connector.

9. The flexible portable electronic device according to claim 1, wherein the electronic assembly for processing information includes a second electronic component with a substantially flat surface, wherein the second electronic component is arranged substantially underneath a third electronic component, the second electronic component being mechanically held on only one portion of the surface thereof to the first electronic component.

10. The portable electronic device according to claim 9, wherein the second electronic component is a flexible printed circuit, and wherein the third electronic component is a light guide arranged underneath a display device.

11. The flexible portable electronic device according to claim 10, wherein the electronic assembly for processing information includes a rechargeable accumulator arranged underneath the flexible printed circuit, the rechargeable accumulator being secured on only one portion of the surface thereof to the flexible printed circuit.

12. The flexible portable electronic circuit according to claim 11, wherein the second electronic component is arranged spaced apart from the first electronic component along the longitudinal axis, the second electronic component being connected to the first electronic component by a resilient electrical connector.

13. The flexible portable electronic circuit according to claim 10, wherein the second electronic component is arranged spaced apart from the first electronic component along the longitudinal axis, the second electronic component being connected to the first electronic component by a resilient electrical connector.

14. The flexible portable electronic circuit according to claim 9, wherein the second electronic component is arranged spaced apart from the first electronic component along the longitudinal axis, the second electronic component being connected to the first electronic component by a resilient electrical connector.

15. A flexible portable electronic device capable of elaborating information, comprising:
    a flexible body arranged to be capable of being secured to a part of a user's body, wherein the flexible body includes a lower flexible band and an upper flexible band; and
    an electronic assembly for processing information including at least a second electronic component with a substantially flat surface, wherein the second electronic component is housed between the lower flexible band and the upper flexible band of the flexible body, the second electronic component being arranged substantially underneath a third electronic component, wherein the second electronic component is mechanically held by adhering only one portion of the surface of the second electronic to the third electronic component, and the portion of the surface of the second electronic component that is adhered to third electronic component is transverse to a longitudinal axis of symmetry of the flexible portable electronic device.

16. The portable electronic device according to claim 15, wherein the second electronic component is a flexible printed circuit, and wherein the third electronic component is a light guide arranged underneath a display device.

17. The flexible portable electronic device according to claim 16, wherein the electronic assembly for processing information includes a rechargeable accumulator arranged underneath the flexible printed circuit and secured on only one portion of the surface thereof to the flexible printed circuit.

18. The flexible portable electronic circuit according to claim 17, wherein the second electronic component is arranged spaced apart from a first electronic component along the longitudinal axis, wherein the first electronic component is housed between the lower flexible band and the upper flexible band of the flexible body, the first electronic component being mechanically held to one of the lower and upper flexible bands by adhering only one portion of a surface of the first electronic component that faces the one of the upper or lower flexible bands, the portion of the surface of the first electronic component that is adhered to the one of the upper or lower flexible bands is transverse to the longitudinal axis of symmetry of the flexible portable electronic device, and wherein the second electronic component is connected to the first electronic component by a resilient electrical connector.

19. The flexible portable electronic circuit according to claim 16, wherein the second electronic component is arranged spaced apart from a first electronic component along the longitudinal axis, wherein the first electronic component is housed between the lower flexible band and the upper flexible band of the flexible body, the first electronic component being mechanically held to one of the lower and upper flexible bands by adhering only one portion of a surface of the first electronic component that faces the one of the upper or lower flexible bands, the portion of the surface of the first electronic component that is adhered to the one of the upper or lower flexible bands is transverse to the longitudinal axis of symmetry of the flexible portable electronic device, and wherein the second electronic component is connected to the first electronic component by a resilient electrical connector.

20. The flexible portable electronic circuit according to claim 15, wherein the second electronic component is arranged spaced apart from a first electronic component along the longitudinal axis, wherein the first electronic component is housed between the lower flexible band and the upper flexible band of the flexible body, the first electronic component being mechanically held to one of the lower and upper flexible bands by adhering only one portion of a surface of the first electronic component that faces the one of the upper or lower flexible bands, the portion of the surface of the first electronic component that is adhered to the one of the upper or lower flexible bands is transverse to the longitudinal axis of symmetry of the flexible portable electronic device, and wherein the second electronic component is connected to the first electronic component by a resilient electrical connector.

* * * * *